(12) United States Patent
Goldbaum

(10) Patent No.: US 7,437,976 B1
(45) Date of Patent: Oct. 21, 2008

(54) POSITIVE AUTO-BLOCKING NUT ENSEMBLE AND TORQUEING TOOL

(76) Inventor: Harold Goldbaum, 22 Pine Arbor La., Apt. 202, Vero Beach, FL (US) 32962

( * ) Notice: Subject to any disclaimer, the term of this patent is extended or adjusted under 35 U.S.C. 154(b) by 63 days.

(21) Appl. No.: 11/515,644

(22) Filed: Sep. 5, 2006

(51) Int. Cl.
*B25B 13/06* (2006.01)
*F16B 39/12* (2006.01)

(52) U.S. Cl. ................ 81/121.1; 411/237
(58) Field of Classification Search ......... 411/221–223, 411/237–239, 241, 253, 254, 278, 433, 900, 411/998
See application file for complete search history.

(56) References Cited

U.S. PATENT DOCUMENTS

| | | | |
|---|---|---|---|
| 7,505 A | 7/1850 | Naylor | |
| 257,854 A | 5/1882 | Dillon | |
| 262,579 A * | 8/1882 | Dillon | 411/237 |
| 490,585 A | 1/1893 | McCormick | |
| 579,848 A | 3/1897 | Thompson | |
| 597,823 A | 1/1898 | Murphey | |
| 679,618 A | 7/1901 | Hanson | |
| 876,081 A | 1/1908 | Orr | |
| 889,319 A | 6/1908 | Martin | |
| 897,168 A | 8/1908 | Smith | |
| 898,432 A | 9/1908 | Boyle | |
| 1,077,119 A | 10/1913 | Bixby | |
| 1,137,042 A | 4/1915 | Willison | |
| 1,157,596 A | 10/1915 | Sherman | |
| 1,328,401 A * | 1/1920 | Savidge | 411/222 |
| 1,346,730 A | 7/1920 | Viebrock | |
| 1,539,213 A | 5/1925 | Shaw | |
| 1,606,941 A * | 11/1926 | Holman | 411/237 |
| 1,607,873 A | 11/1926 | Cowder | |
| 1,639,407 A * | 8/1927 | Hutton | 411/223 |
| 1,806,506 A | 5/1931 | Savidge | |
| 1,928,982 A | 10/1933 | Rosenbaum | |
| 1,944,595 A * | 1/1934 | Crowther | 411/270 |
| 1,975,815 A | 10/1934 | Wilson | |
| 2,244,400 A * | 6/1941 | Miller | 411/238 |
| 2,285,345 A * | 6/1942 | Miller | 411/238 |
| 2,374,266 A | 4/1945 | Barr | |
| 2,384,953 A | 9/1945 | Miller | |
| 2,518,469 A | 8/1950 | Harding | |
| 3,575,641 A | 4/1971 | Summers | |
| 3,621,697 A | 11/1971 | McPherson | |
| 3,750,732 A | 8/1973 | Moebius | |
| 4,364,136 A | 12/1982 | Hattan | |
| 4,729,703 A | 3/1988 | Sato | |

(Continued)

*Primary Examiner*—David B Thomas
(74) *Attorney, Agent, or Firm*—Gold & Rizvi, P.A.; Glenn E. Gold; H. John Rizvi

(57) ABSTRACT

A blocking nut ensemble for positional placement on a threaded shaft comprises a first internally threaded nut for threading on a shaft and including a first abutting face having intermediate inner and outer sidewalls depending therefrom and defining an annular groove in the first nut. A second internally threaded nut for threading on the shaft is axially aligned with the first nut. The second nut has a second abutting face and an annular locking flange extending therefrom wherein the annular locking flange is radially positioned in registration with the annular groove in the first nut. The annular flange of the first nut is received in the annular groove of the second nut when the first abutting face abuts the second abutting face thereby locking the first nut to the second nut.

21 Claims, 2 Drawing Sheets

U.S. PATENT DOCUMENTS

| | | |
|---|---|---|
| 4,768,908 A | 9/1988 | Fauchet |
| 4,790,703 A | 12/1988 | Wing |
| 4,826,376 A | 5/1989 | Aldridge et al. |
| 4,840,526 A | 6/1989 | Bourdonne |
| 4,909,689 A | 3/1990 | Komatsu |
| 4,936,727 A | 6/1990 | Kolvereid |
| 5,154,560 A | 10/1992 | Copito |
| 5,248,232 A | 9/1993 | Chiang |
| 5,314,279 A | 5/1994 | Ewing |
| 5,320,466 A | 6/1994 | Suzuki |
| 5,439,337 A | 8/1995 | Kakimoto |
| 5,544,991 A | 8/1996 | Richardson |
| 5,915,902 A | 6/1999 | Patterson et al. |
| 6,113,329 A | 9/2000 | Moroi et al. |
| 6,679,663 B2 | 1/2004 | DiStasio et al. |
| 6,976,817 B1 | 12/2005 | Grainger |

\* cited by examiner

POSITIVE AUTO-BLOCKING NUT ENSEMBLE AND TORQUEING TOOL

TECHNICAL FIELD

The present invention relates to mechanical fastening systems and more particularly to cooperatively engaging blocking nuts.

BACKGROUND OF THE INVENTION

One of the most common mechanical fastening systems in use today is a bolt or screw having a threaded shaft and a head on one end wherein a nut is threaded onto the shaft at an opposite end. The threaded shaft is typically received in a hole in the work piece or multiple work pieces and captured between the head and the nut. The items are then secured by rotating the nut on the threaded shaft until the work piece is secured between the nut and the head. As this simple fastening system became more widely adopted in industry, users discovered that over time, regardless of the degree of torque applied to tighten the nut, the nut would eventually loosen. This undesirable characteristic was discovered to be even more pronounced in applications where the assembly was subject to vibration, widely varying thermal cycles, and mechanical shock. Still other uses of threaded shafts and nuts include applications where a nut is desired to be secured at a desired position along the threaded shaft without necessarily being torqued against a work piece.

In an attempt to maintain the desired position of the nut or to maintain a desired torque on the bolt and nut combination, various means of locking the nut to the threaded shaft have been implemented. Some of these means include a resilient lock washer, a small set-screw threaded into the side of the nut engaging the threads of the bolt shaft, a resin ring molded interiorly to the nut threads and closely engaging the threads of the shaft, and even utilizing a safety wire through a hole in the nut and fastened to a separate structure. The above methods of preventing the loosening or repositioning of nuts have enjoyed various degrees of success. Some have been incorporated with relative ease of installation, but have not been very successful in maintaining the desired torque. Others have been incorporated with reasonable success in maintaining the desired torque, but have been difficult to install.

In those applications wherein the nut is desired to be positionally retained on the threaded shaft and not able to be torqued against a work piece, the most common means of securing the nut in place is to thread a second, or blocking, nut on the shaft and abutting the first nut thereby blocking the unwanted rotation of the first nut. Opposing torque is then applied to the abutting nuts and the dual nut combination is positionally fixed along the shaft by the friction between the abutted faces of the nuts and the opposing frictional force of the nut threads against the threads of the shaft. However, a pair of opposingly torqued nuts is subject to the same thermal, vibrational, and shock environments discussed above that lead to eventual unwanted disengagement of the nuts.

Thus what is desired is an ensemble of blocking nuts that is simple to install and in addition will reliably maintain its desired position throughout the life of the mechanism on which it is installed.

SUMMARY OF THE INVENTION

One aspect of the present invention is a blocking nut ensemble for positional placement on a threaded shaft comprising a first internally threaded nut for threading on a shaft the first nut including a first abutting face having intermediate inner and outer sidewalls depending therefrom and defining an annular groove. The blocking nut ensemble also includes a second internally threaded nut for threading on the shaft wherein the second nut includes a second abutting face and an annular locking flange extending therefrom wherein the annular locking flange is radially positioned in registration with the annular groove in the first nut when the second nut is axially aligned with the first nut. The annular flange of the first nut is received in the annular groove of the second nut when the first abutting face abuts the second abutting face thereby locking the first nut to the second nut.

Another aspect of the present invention is a combination blocking nut ensemble and torqueing tool. The blocking nut ensemble includes a first internally threaded nut having an inner portion and an outer portion wherein the inner and outer portions define an annular groove therebetween. The annular groove is angled radially outward from a rotational axis of the first nut such that a top of the annular groove is more radially distant from the axis than a bottom of the annular groove. A second internally threaded nut includes an annular locking flange substantially geometrically identical to the annular groove and is in registration therewith when the first and the second nut are axially aligned one with the other. The annular locking flange is received in the annular groove when the first nut axially abuts the second nut, and the annular locking flange further applies a radially inward force upon the inner portion of the first nut. The torqueing tool includes an outer tip wrench, which has a tubular body having an opening at one end and a recess at the opposite end. The recess is configured to engage the first internally threaded nut. An inner tip wrench is telescopically received in the outer tip wrench. The inner tip wrench includes a shaft having a recess configured to engage the second internally threaded nut in the end received in the outer tip wrench.

These and other advantages of the invention will be further understood and appreciated by those skilled in the art by reference to the following written specification, claims and appended drawings.

BRIEF DESCRIPTION OF THE DRAWINGS

Like reference numerals refer to like parts throughout the several views of the drawings.

DETAILED DESCRIPTION OF THE PREFERRED EMBODIMENT

Figure 2:
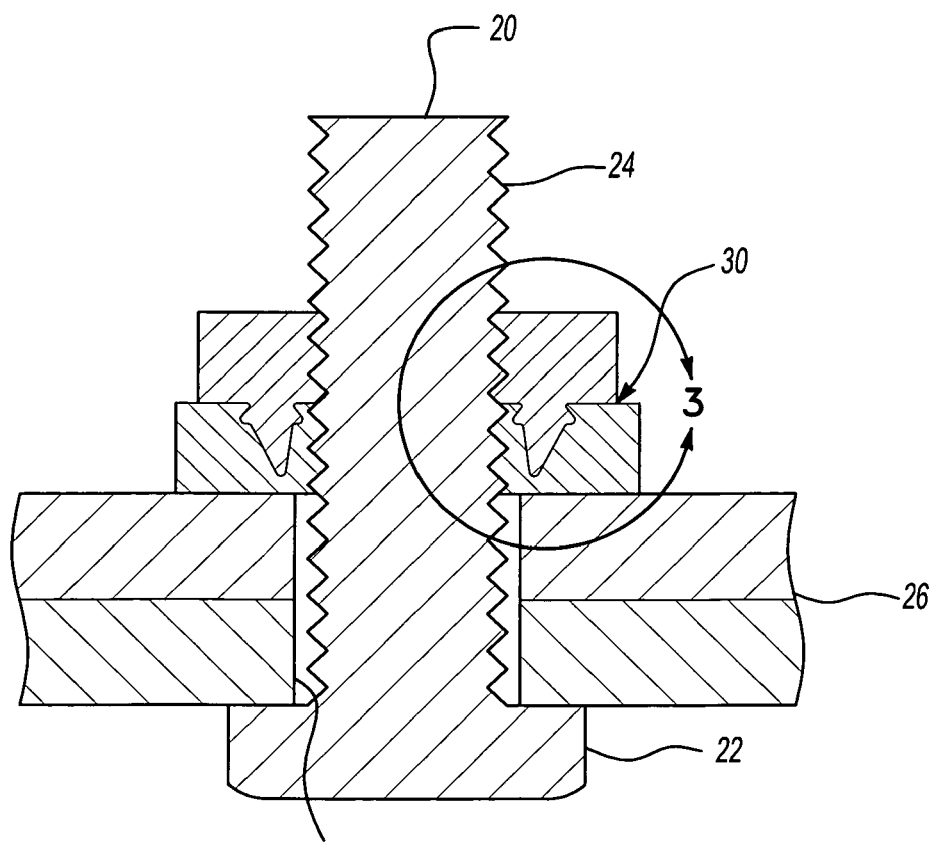
FIG. 2 is an elevational cross-section view of the blocking nut ensemble of FIG. 1 and taken along the line 2-2, FIG. 1.

For purposes of description herein, the terms "upper", "lower", "left", "rear", "right", "front", "vertical", "horizontal", and derivatives thereof shall relate to the invention as oriented in FIG. 2. However, one will understand that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
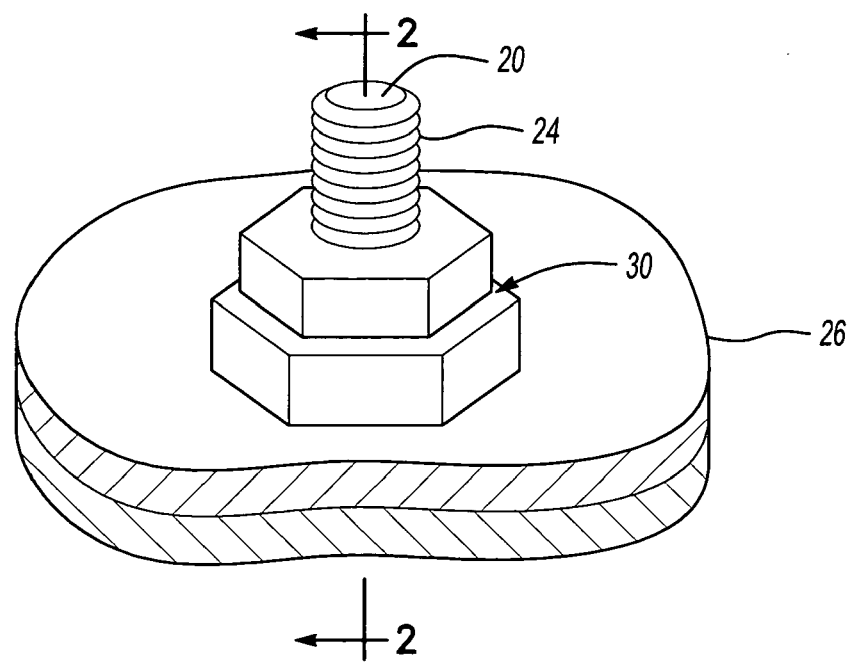
FIG. 1 is a perspective view of a blocking nut ensemble embodying the present invention, wherein the nut ensemble is holding a work piece onto a bolt.

Turning to the drawings, FIGS. 1 and 2 show a nut ensemble 30 that is one of the preferred embodiments of the present invention and illustrates its various components. Nut ensemble 30 is threaded onto the threads 24 of a bolt 20 extending through hole 28 in a work piece 26 thereby clamping work piece 26 between the nut ensemble 30 and bolt head 22. While this application illustrates the use of one embodiment of nut ensemble 30 to retain the various elements of work piece 26 in a clamped relationship, those practiced in the art will readily recognize from the following description that nut ensemble 30 can also be positioned at any point along the threads 24 of bolt 20 or other similarly threaded shaft and positionally maintained in a reliably secure fashion as a result of the inter-locking cooperation of nut ensemble 30 without bearing against a separate work piece.

Figure 3:
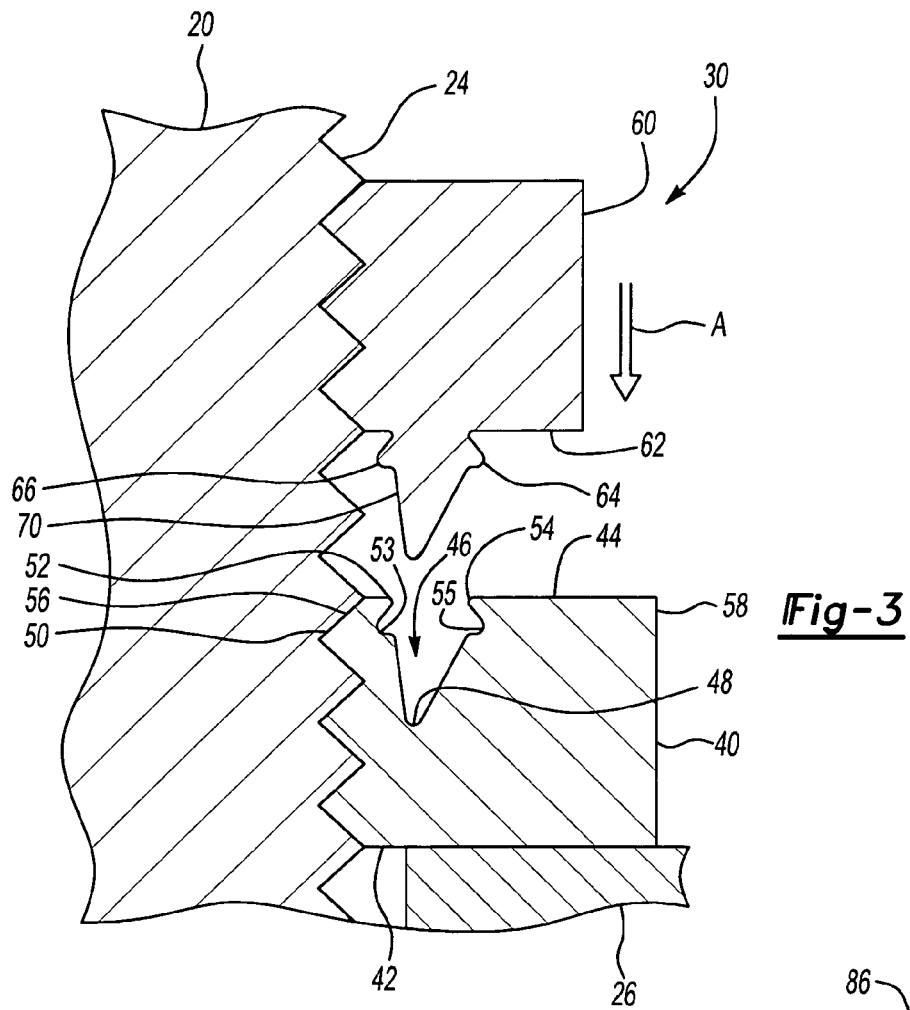
FIG. 3 is an enlarged cross-sectional view of the nut ensemble shown in FIG. 2 and indicated by the numeral 3, FIG. 2, wherein the nuts are shown prior to engagement to illustrate the engagement features.

Referring now to FIGS. 2 and 3, nut ensemble 30 comprises a first internally threaded nut 40 and a second internally threaded nut 60 wherein first internally threaded nut 40 preferably has a larger outer diameter than second internally threaded nut 60. Nuts 40, 60 also have a preferably polygonal exterior configuration for gripping with a wrench for proper torqueing. FIG. 2 illustrates nuts 40 and 60 in interlocking engagement one with the other and FIG. 3 illustrating nut 60 being torqued along bolt 20 prior to engaging nut 40. Those practiced in the art will recognize that certain of the features illustrated in the various figures and described herein are not to scale and have been enlarged for purposes of clarity.

As illustrated in FIG. 3, first internally threaded nut 40 is torqued into position on bolt 20. Nut 40 has a bottom bearing surface 42 which contacts work piece 26 and is initially maintained in rotational position about bolt 20 by the frictional force generated from torqueing nut 40 against work piece 26. Nut 40 further has a first abutting face 44 opposite from bearing surface 42, and a top portion of nut 40 is comprised of an inner portion 56 and an outer portion 58. Inner portion 56 and outer portion 58 define therebetween a V-shaped annular groove 46 in the top of nut 40 and extending around the entirety of nut 40. Annular groove 46 is substantially centered about a rotational axis (not shown) of nut 40. Annular groove 46 is radially positioned such that inner portion 56 partially defining annular groove 46 is relatively thin and susceptible to resilient movement in response to axial forces applied thereto. Thus, inner portion 56 of nut 40 forms a resilient ring 50. The inner portion 56 and outer portion 58 each partially defining annular groove 46 further define undercuts 53, 55 respectively in the sidewalls of annular groove 46 and in combination with first abutting surface 44 further form lips 52 and 54 extending partially over annular groove 46. Lips 52, 54 can also have a radiused edge to eliminate unwanted sharp edges. V-shaped annular groove 46 has a radiused apex 48 and is slightly angled off-vertical to orient apex 48 toward the rotational axis (not shown) of nut 40.

Referring again to FIG. 3, second internally threaded nut 60 has a second abutting surface 62 on the bottom of second nut 60. A V-shaped annular locking flange 70 depends from second abutting surface 62 and is positioned in registration with annular groove 46 in first nut when second nut 60 is axially aligned with first nut 40. Annular locking flange 70 has a cross-sectional geometry substantially identical to the geometry of annular groove 46 such that upon engagement therein, annular locking flange 70 is closely received in annular groove 46. Annular locking flange 70 can be slightly wider than annular groove 46 or slightly less angled toward rotational axis (not shown) of nut 40 than annular groove 46 to create interference between the abutting surfaces of inner portion 56 and locking flange 70. Annular locking flange 70 includes an outer radiused nose 64 and an inner radiused nose 66 for engagement with undercuts 53, 55.

In use, first internally threaded nut 40 is longitudinally positioned on a threaded shaft such as bolt 20 by rotating first nut 40 about threads 24 until first nut 40 is positioned as desired (either in contact with a work piece or independent of any external structure). Second internally threaded nut 60 is then threaded about threads 24 and advancing second nut 60 along bolt 20 in direction "A" until second nut 60 is proximate to first nut 40. First nut 40 is rotationally retained in a stationary manner while additional torque is applied to second nut 60 thereby driving annular locking flange 70 into annular groove 46. As locking flange 70 engages into annular groove 46, locking flange 70 bears against inner portion 56 thereby locking inner portion against threads 24 of bolt 20. As surface 62 of nut 60 comes in contact with surface 44 of nut 40, radiused noses 64, 66 and lips 52, 54 are resiliently displaced to permit radiused noses 64, 66 to become seated in undercuts 53, 55 to further lock nuts 40, 60 into mutual locked engagement. As locking flange 70 becomes firmly seated in annular groove 46 its angulation and size exerts a resultant inward radial force against resilient ring 50 thereby forcing its inner threaded surface against threads 24 of bolt 20. Second nut 60, upon full engagement of annular locking flange 70 in annular groove 46 and forcing resilient ring 50 against threads 24, blocks first nut 40 from further rotation and repositioning on threads 24 of bolt 20.

Second internally threaded nut 60 can be formed from a material that exhibits greater malleability characteristics than first internally threaded nut 40. The greater malleability of second nut 60 and therefore also of annular locking flange 70 facilitates the plastic flow of material in annular locking flange 70 to compensate for tolerance mismatches and to therefore increase the inward radial force against resilient ring 56 of first nut 40 and threads 24 of bolt 20.

Those practiced in the art will also readily recognize that first nut 40 can have a plurality of concentric annular grooves 46 defined in first abutting surface 44 according to the relative width of the groove compared to the width of the abutting surface 44. In like manner, second nut 60 would then have a like plurality of concentric annular locking flanges 70 depending from second abutting surface 62 such that each locking flange 70 is in registration with and received in one of annular grooves 46 in first nut 40.

Figure 4:
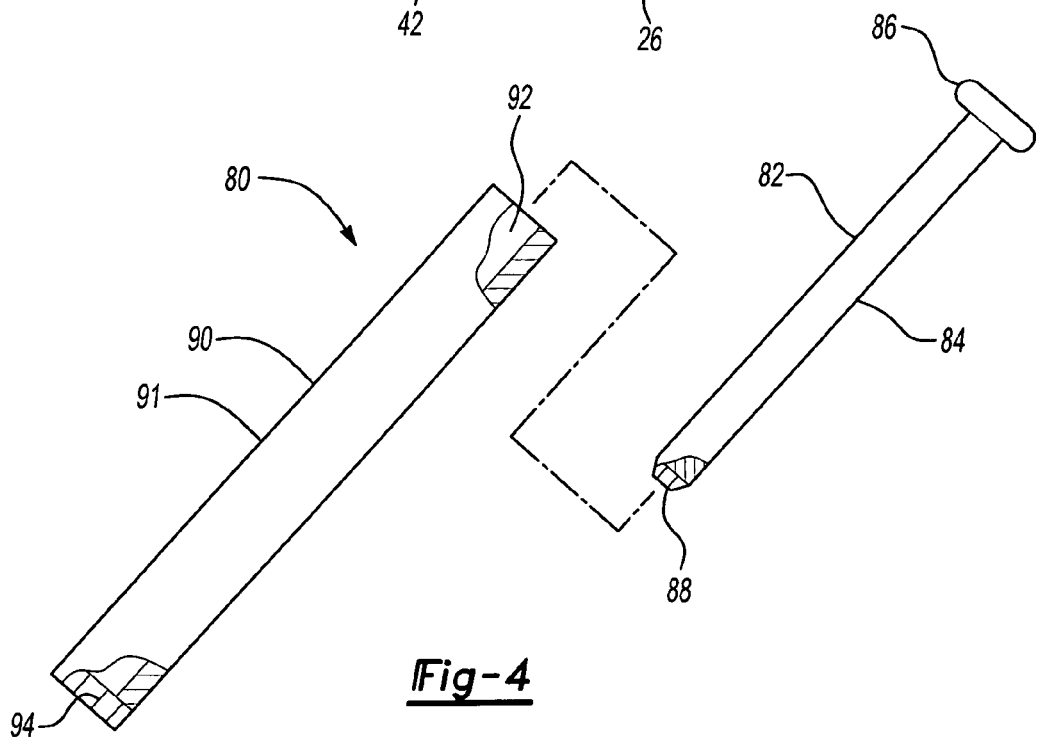
FIG. 4 is an exploded view of a tip wrench combination for securing the blocking nut ensemble.

Referring to FIG. 4 a torqueing tool 80 is shown for installing blocking nut ensemble 30. Some applications of nut ensemble prevent the use of standard wrenches for torqueing of nuts 40, 60 as in when the outer diameter of nuts 40, 60 are relatively small such as for applications for eyeglasses. Torqueing tool 80 comprises an inner tip wrench 82 and an outer tip wrench 90. Inner tip wrench 82 comprises a solid shaft 84 having a head 86 at one end for manual rotation of inner tip wrench 82 and a recess 88 at an opposite end. Recess 88 is formed to fit over and engage nut 60 for rotation about bolt 20. Outer tip wrench 90 comprises a tubular body 91 having an inner passageway 92 of sufficient diameter to receive shaft 84 of inner tip wrench 82. Outer tip wrench 90 further includes a recess 94 at a lower end formed to fit over and engage nut 40 for rotation about bolt 20.

In use, outer tip wrench 90 is engaged over first nut 40 and rotated to torque first nut 40 around bolt 20 and into contact with work piece 26. Outer tip wrench 90 is retained in engagement with first nut 40 for maintaining torque on first nut 40. Inner tip wrench is inserted in passageway 92 of outer tip wrench 90 such that recess 88 of inner tip wrench 82 engages second nut 60. Head 86 of tip wrench 82 is rotated to torque second nut 60 into blocking engagement with first nut 40 while tip wrench 90 maintains the original torque on first nut 40. To disengage second nut 60 from first nut 40, outer tip wrench 90 is engaged over first nut 40 and second tip wrench 82 is then inserted in passageway 92 of outer tip wrench 90 to engage second nut 60. Second tip wrench 90 is held stationary while inner tip wrench 82 is rotated to disengage second nut 60. Once second nut 60 is disengaged, second tip wrench 90 is rotated to disengage first nut 40 from nut 20.

In the foregoing description those skilled in the art will readily appreciate that modifications may be made to the invention without departing from the concepts disclosed herein. Such modifications are to be considered as included in the following claims, unless these claims expressly state otherwise.

What is claimed is:

1. A blocking nut ensemble for positional placement on a threaded shaft, said blocking nut ensemble comprising:
    a first internally threaded nut for threading on a shaft, said first nut including a first abutting face having intermediate inner and outer sidewalls depending therefrom, said inner and outer sidewalls defining an annular groove in said first nut;
    a second internally threaded nut for threading on the shaft, said second nut having a second abutting face and an annular locking flange extending therefrom, said annular locking flange radially positioned in registration with said annular groove in said first nut when said first nut and said second nut are axially aligned; and further wherein:
    said annular flange is received in said annular groove when said first abutting face abuts said second abutting face, locking said first nut to said second nut; and
    at least one of said sidewalls defining said annular groove further defines an undercut.

2. The blocking nut ensemble according to claim 1 wherein said undercut forms in conjunction with said first abutting surface a lip extending at least partially into an upper portion of said annular groove.

3. The blocking nut ensemble according to claim 2 wherein said lip is radiused.

4. The blocking nut ensemble according to claim 3 wherein said annular locking flange includes a radiused nose thereon for engagement with said undercut.

5. The blocking nut ensemble according to claim 4 wherein an opposite of said sidewalls defining said annular groove defines an opposite undercut and wherein said annular locking flange includes a second radiused nose thereon for engagement with said opposite undercut.

6. The blocking nut ensemble according to claim 1 wherein said second nut is formed from a material having greater malleability than said first nut.

7. The blocking nut ensemble according to claim 1 wherein said first nut includes a plurality of concentric annular grooves defined therein and wherein said second nut includes a like plurality of annular locking flanges, each said annular locking flange in registration with one of said plurality of annular grooves.

8. A blocking nut ensemble for positional placement on a threaded shaft, said blocking nut ensemble comprising:
    a first internally threaded nut for threading on a shaft, said first nut including a first abutting face having intermediate inner and outer sidewalls depending therefrom, said inner and outer sidewalls defining an annular groove in said first nut;
    a second internally threaded nut for threading on the shaft, said second nut having a second abutting face and an annular locking flange extending therefrom, said annular locking flange radially positioned in registration with said annular groove in said first nut when said first nut and said second nut are axially aligned; and further wherein:
    said annular flange is received in said annular groove when said first abutting face abuts said second abutting face, locking said first nut to said second nut; and
    wherein a portion of said first nut between said internal threads and said annular groove is a radially resilient ring.

9. The blocking nut ensemble according to claim 8 wherein said annular locking flange is angled with respect to said annular groove such that when said annular locking flange is received in said annular groove, said annular locking flange imparts a radial force on said resilient ring toward said internal threads of said first nut.

10. A combination blocking nut ensemble and torqueing tool for torqueing said blocking nut ensemble, said combination comprising:
    a blocking nut ensemble for positional placement on a threaded shaft including:
        a first internally threaded nut for threading on a shaft, said first nut having an inner portion and an outer portion, said inner and outer portions defining an annular groove therebetween wherein said annular groove is angled radially outwardly from a rotational axis of said first nut such that a top of said annular groove is more radially distant from said axis than a bottom of said annular groove;
        a second internally threaded nut for threading on a shaft, said second nut having an outer diameter less than said first internally threaded nut and including an annular locking flange substantially geometrically identical to said annular groove and in registration therewith when said first and said second nut are axially aligned one with the other; and further wherein:
        said annular locking flange is received in said annular groove when said first nut axially abuts said second nut, said annular locking flange applying a radially inward force upon said inner portion of said first nut; and
    a torqueing tool for torqueing said nut ensemble including:
        an outer tip wrench having a tubular body with an opening at one end and a recess configured to engage said first internally threaded nut at an opposite end; and
        an inner tip wrench having a shaft telescopically received in said tubular body of said outer tip wrench, said shaft having a recess configured to engage said second internally threaded nut in an end of said shaft received in said outer tip wrench.

11. The combination blocking nut ensemble and torqueing tool according to claim 10 wherein said annular groove includes opposing sidewalls, one of said sidewalls further defining an undercut therein.

12. The combination blocking nut ensemble and torqueing tool according to claim 11 wherein said undercut forms in conjunction with said first abutting surface a lip extending at least partially into an upper portion of said annular groove.

13. The combination blocking nut ensemble and torqueing tool according to claim 12 wherein said lip is radiused.

14. The combination blocking nut ensemble and torqueing tool according to claim 13 wherein said annular locking flange includes a radiused nose thereon for engagement with said undercut.

15. The combination blocking nut ensemble and torqueing tool according to claim 14 wherein said inner portion of said first nut defining an inner portion of said annular groove is a radially resilient ring.

16. The combination blocking nut ensemble and torqueing tool according to claim 15 wherein an opposite of said sidewalls defining said annular groove defines an opposite undercut and wherein said annular locking flange includes a second radiused nose thereon for engagement with said opposite undercut.

17. The combination blocking nut ensemble and torqueing tool according to claim 10 wherein said second nut is formed from a material having greater malleability than said first nut.

18. The combination blocking nut ensemble and torqueing tool according to claim 17 wherein said annular locking flange is angled with respect to said annular groove such that when said annular locking flange is received in said annular groove, said annular locking flange imparts a radial force on said resilient ring toward said internal threads of said first nut.

19. The combination blocking nut ensemble and torqueing tool according to claim 10 wherein said first nut includes a plurality of concentric annular grooves defined therein and wherein said second nut includes a like plurality of annular locking flanges, each said annular locking flange in registration with one of said plurality of annular grooves.

20. The combination blocking nut ensemble and torqueing tool according to claim 10 wherein said inner torqueing tool includes a head on an end of said shaft opposite from said recess.

21. The combination blocking nut ensemble and torqueing tool according to claim 20 wherein said first and said second internally threaded nuts have a polygonal exterior configuration and further wherein said inner tip wrench recess and said outer tip wrench recesses have a like polygonal configuration for engaging said nuts.

\* \* \* \* \*